(12) United States Patent
Priester

(10) Patent No.: US 7,601,065 B2
(45) Date of Patent: Oct. 13, 2009

(54) SYSTEM AND METHOD FOR PLAYING A GAME

(75) Inventor: Paul George Priester, Rotterdam (NL)

(73) Assignee: M-Comm B.V., Rhoon (NL)

( * ) Notice: Subject to any disclaimer, the term of this patent is extended or adjusted under 35 U.S.C. 154(b) by 858 days.

(21) Appl. No.: 10/493,666

(22) PCT Filed: Oct. 24, 2002

(86) PCT No.: PCT/NL02/00678

§ 371 (c)(1),
(2), (4) Date: Apr. 26, 2004

(87) PCT Pub. No.: WO03/035200

PCT Pub. Date: May 1, 2003

(65) Prior Publication Data

US 2004/0254018 A1    Dec. 16, 2004

(30) Foreign Application Priority Data

Oct. 26, 2001    (NL)    .................................... 1019239

(51) Int. Cl.
*A63F 9/24*    (2006.01)
*A63F 13/00*   (2006.01)
*G06F 17/00*   (2006.01)
*G06F 19/00*   (2006.01)

(52) U.S. Cl. ...................... 463/31; 273/138.1; 273/439; 273/459; 434/159; 434/167; 434/169; 392/88; 392/90; 392/92; 463/16; 700/90; 700/93

(58) Field of Classification Search .................... 463/10, 463/40–41; 273/272; 379/93.13; 455/3.06
See application file for complete search history.

(56) References Cited

U.S. PATENT DOCUMENTS

| | | | | | |
|---|---|---|---|---|---|
| 4,350,342 | A | * | 9/1982 | Barulich | 273/240 |
| 4,891,775 | A | * | 1/1990 | McWherter | 463/22 |
| 4,923,199 | A | * | 5/1990 | Hahn | 273/299 |
| 5,203,705 | A | | 4/1993 | Hardy et al. | 434/169 |
| 5,255,925 | A | * | 10/1993 | Small | 463/9 |
| 5,263,723 | A | * | 11/1993 | Pearson et al. | 463/41 |
| 5,435,564 | A | * | 7/1995 | Kennedy et al. | 273/237 |

(Continued)

FOREIGN PATENT DOCUMENTS

| | | |
|---|---|---|
| DE | 199 40 954 | 3/2001 |
| WO | WO0148712 | 5/2001 |

*Primary Examiner*—John M. Hotaling, II
*Assistant Examiner*—Paul Anthony D'Agostino
(74) *Attorney, Agent, or Firm*—Steven M. Koehler; Westerman, Champlin & Kelly, P.A.

(57) ABSTRACT

A system for playing a game comprises a game unit and a number of mobile terminals which can communicate with the game unit. The game unit is arranged for sending a game code to one or more mobile terminals, and the mobile terminals are arranged for sending at least one game code-related reply message to the game unit. Each reply message comprises an identification code of the mobile terminal. The game code is a number consisting of two or more digits, and each digit identifies a key of each mobile terminal. Each reply message is a word composed of letters which have been selected by means of the keys identified by the digits of the game code. The game unit is arranged for verifying the letters of the reply message.

14 Claims, 2 Drawing Sheets

U.S. PATENT DOCUMENTS

| | | | |
|---|---|---|---|
| 5,537,143 A * | 7/1996 | Steingold et al. | 725/119 |
| 5,738,583 A * | 4/1998 | Comas et al. | 463/40 |
| 5,845,905 A * | 12/1998 | Stevens | 273/272 |
| 5,868,388 A * | 2/1999 | Wood et al. | 273/157 R |
| 5,921,864 A * | 7/1999 | Walker et al. | 463/9 |
| 5,921,865 A * | 7/1999 | Scagnelli et al. | 463/17 |
| 5,971,854 A * | 10/1999 | Pearson et al. | 463/41 |
| 5,984,311 A * | 11/1999 | Stefanik et al. | 273/459 |
| 6,117,013 A * | 9/2000 | Eiba | 463/41 |
| 6,120,032 A * | 9/2000 | Wissinger | 273/430 |
| 6,151,387 A * | 11/2000 | Katz | 379/93.13 |
| 6,241,246 B1 * | 6/2001 | Guttin et al. | 273/139 |
| 6,283,476 B1 * | 9/2001 | Henry et al. | 273/459 |
| 6,554,707 B1 * | 4/2003 | Sinclair et al. | 463/39 |
| 6,650,952 B1 * | 11/2003 | Garcia et al. | 700/91 |
| 6,688,982 B2 * | 2/2004 | Moodie et al. | 463/41 |
| 6,785,561 B1 * | 8/2004 | Kim | 455/566 |
| 6,908,389 B1 * | 6/2005 | Puskala | 463/40 |

* cited by examiner

SYSTEM AND METHOD FOR PLAYING A GAME

CROSS-REFERENCE TO RELATED APPLICATION

This Application is a Section 371 National Stage Application of International Application No. PCT/NL02/00678, filed Oct. 24, 2002 and published as WO 03/035200 on May 1, 2003, in English.

BACKGROUND OF THE INVENTION

The invention relates to a system and a method for playing a game, which system comprises a game unit and a number of mobile terminals which can communicate with the game unit, which game unit is adapted to send a game code to one or more mobile terminals and which mobile terminals are adapted to send at least one game code-related reply message to the game unit, wherein each reply message comprises an identification code of the mobile terminal.

Known systems and methods of this kind are arranged for playing games of chance. An example of such a system is described in WO 01/48712. One drawback of a game of chance is the fact that the level of knowledge and/or dexterity of the player has hardly if any influence on the outcome of the game. The game unit may be of relatively simple design, because the game unit only needs to check the reply message for winning or losing.

SUMMARY OF THE INVENTION

The object of the invention is to provide a system and a method of the kind referred to in the introduction by means of which a game can be played, wherein the level of knowledge and/or dexterity of the player determines the outcome of the game.

In order to accomplish that objective, the game code used in the system or the method according to the invention is a number comprising two or more digits, wherein one or more of said digits identify a key of a mobile terminal, and each reply message is a word or a part of a word composed of one or more letters which have been selected by means of the key(s) identified by digits of the game code, wherein the game unit is adapted to verify the letters of the reply message.

In this manner a system and a method are obtained in which the level of knowledge of the players determines the outcome of the game. The game unit must carry out several verification operations on the reply messages in order to determine the score.

BRIEF DESCRIPTION OF THE DRAWINGS

The invention will now be explained in more detail with reference to the drawing.

DETAILED DESCRIPTION OF THE ILLUSTRATIVE EMBODIMENTS

Figure 1:
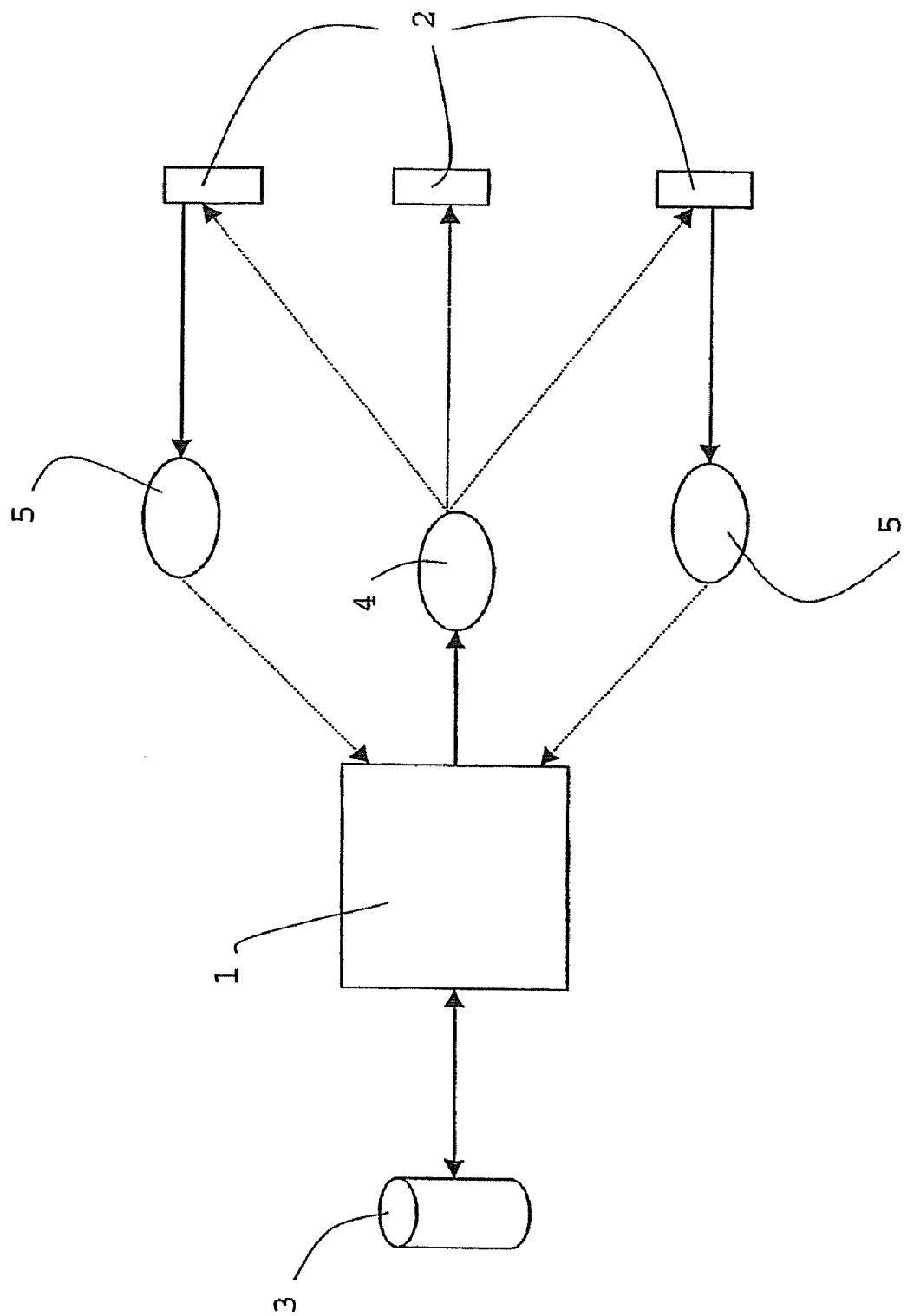
FIG. 1 is a very schematic representation of an embodiment of the system according to the invention.

The system shown in the drawing comprises a game unit 1 and a number of mobile terminals 2, which can communicate with the game unit 1 via a wireless network (not shown). The mobile terminals 2 may be mobile telephones, PDA's or laptops or the like. The network may be a GSM network, a UMTS network or other suitable network. The game unit 1 comprises a database 3 (schematically indicated), in which data relating to users of the mobile terminals 2 are stored. The users register as game participants with the manager of the game unit 1 in advance. Said registration can take place in writing or over the Internet, for example. After having registered, the users receive an information pack with an explanation of the game supported by the game unit 1. The information pack may also include an identification code by means of which the user can identify himself to the game unit 1 when he wants to participate in the game. The use of a special identification code is not necessary, however, since the telephone number is automatically provided when mobile telephones are used. The game unit can use said telephone number for identifying the user associated therewith in the database 3.

Alternatively, participants in the game can present themselves as participants to the game unit 1 by means of their mobile terminal 2, for example by sending a game entry code.

Figure 2:
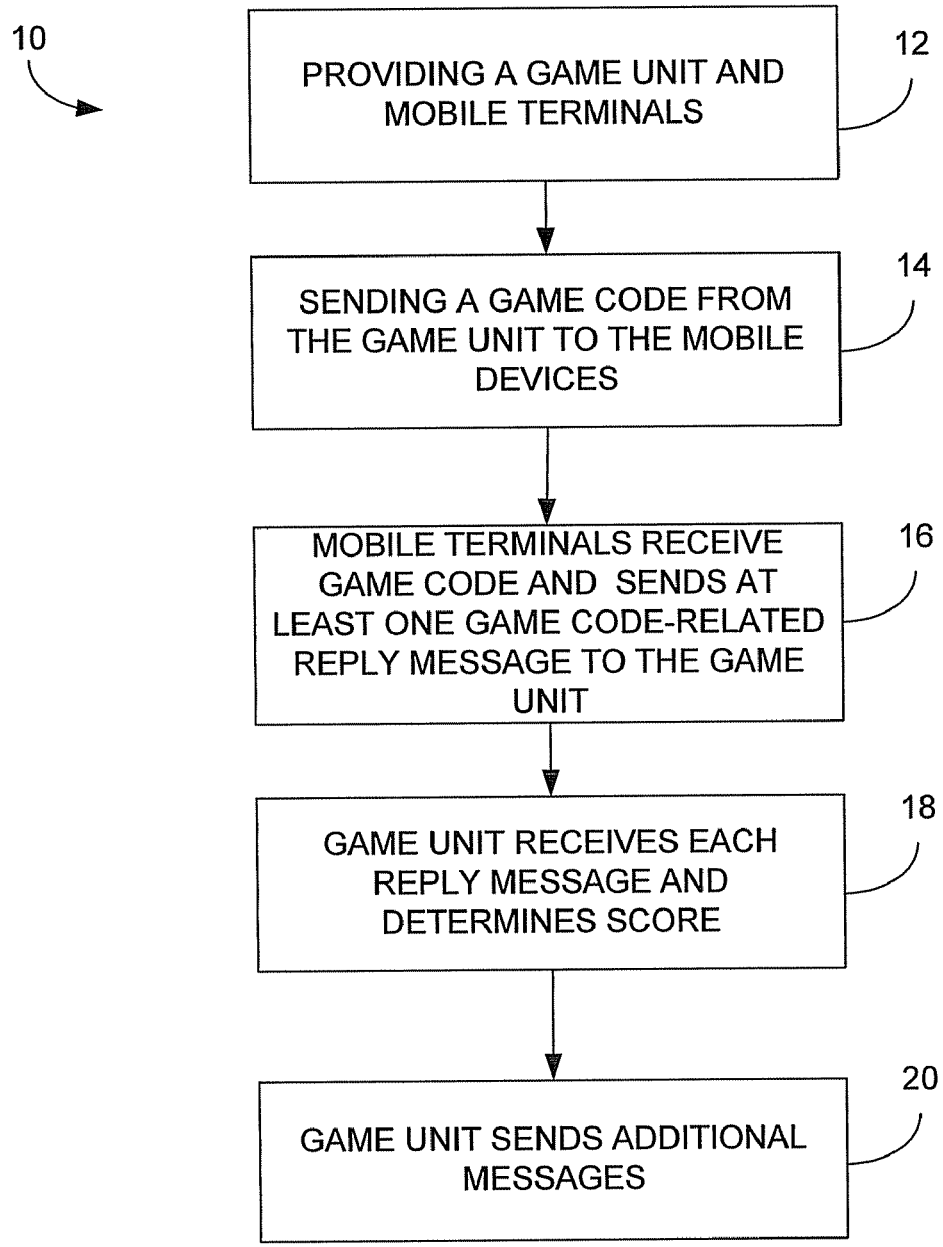
FIG. 2 is a method of operation of the system

With the system as described and provided as indicated at step 12 in method 10 of FIG. 2, the game unit 1 generates a three-digit number as game code 4 at the beginning of a new round or period of the game. Each digit is in the series 2 up to 9 and identifies a key of each mobile telephone. As is well-known, three or four different letters can be input with each of the numeric keys 2-9 of a mobile telephone, and consequently each digit from the game code 4 corresponds to three or four different letters from the alphabet. At step 14, the game code 4 is sent to all the mobile terminals 2 of those who have registered as participants in the game in the form of an SMS message. At step 16, the game code is received at each mobile terminal 2 and each participant must form Dutch words from the letters identified by the digits of the game code 4, and each word formed of said letters must be sent to the game unit 1 in the form of an SMS reply message 5.

At step 18, thee game unit 1 receives the reply messages and identifies the participant by means of the identification code or the telephone number and verifies for each reply message 5 whether the letters of the word correspond to the digits of the generated game code. The game unit 1 furthermore checks whether the word formed by the letters is an existing Dutch word. If these two requirements are met, the game unit 1 determines a game score by adding up the digits corresponding to the letters of the word. In the preferred embodiment, the game score is only accepted if the sum of the digits is larger than the sum of the digits of the transmitted game code 4. Each accepted game score is recorded for each participant, and said scores are accumulated to obtain a total score. In order to prevent participants submitting the same word two or more times, the game unit 1 compares each word that is received from each participant with previously received words and only accepts the game score of new words. At the end of a round, the participant having the highest total score wins. The participant in question can be informed of having won the round by means of an SMS message, which is sent by the game unit 1.

A round may take up one day, for example. At 00.00 hours the game unit 1 generates a game code for that day and sends it to all participating mobile terminals 2. The round closes at 24.00 hours. A round may be subdivided into sub-rounds, wherein a prize can be awarded in every sub-round to the participant with the highest total score in said sub-round. The sub-round can be considered as a first game period, in which the game unit 1 selects one or more winning total scores from the total scores of the participants. The scores for the first period or sub-round are retained and remain valid for the overall round or second period. After the second period, all the recorded total scores are erased and a new round begins. A participant can participate in the game in every sub-round and submit words that were submitted in a previous sub-round anew. The score of said words counts for a new sub-round but not for the overall round. It is also possible to use numbers comprising two, four or more digits instead of a three-digit number. Of course the game can also be played in languages different than Dutch.

It is noted that several variants to the system as described above are possible. In some of these variants, additional messages are sent by the game unit 1 at step 20. The system may be arranged for a word game, for example, wherein a first game code is sent to the mobile terminal, whether or not with a hint for the word represented by the game code. The participant can then send the word he thinks is correct to the game unit, after which the game unit sends a second game code for a next word, whether or not with an associated hint. After the participant has sent said word to the game unit again, the game unit will transmit to the terminal a game code representing a word which brings the two words that have previously been given as the solution into connection. Also in this case a hint may be added to the game code or be sent separately at a later point in time.

According to another variant, the game unit supplies a game code whose digits indicate one letter or a few letters of a word that is wanted. The participant in the game can send the wanted letter or letters to the game unit via his mobile telephone, after which the game unit sends a next game message to the participant's mobile telephone, wherein the received letters are shown at their correct place in the wanted word. The participant can then try to find a next letter of the wanted word and send it to the game unit. If the participant has submitted a correct letter, the game unit will send a next game message, wherein the letter that has been found is shown at its correct place in the word again.

Another possible variant of the system as described herein comprises a game unit which sends a game code whose digits indicate the keys of the mobile terminal as well as the number of times that said keys must be operated for the wanted letters. The game code further indicates how many letters the wanted word comprises. The participant can then try to find the correct word by means of the digits of the game code and the number of letters of the word and submit his solution to the game unit in a reply message.

The invention is not restricted to the embodiment as described above, which can be varied in many ways within the scope of the invention as defined in the claims.

The invention claimed is:

1. A system for playing a game, which system comprises a game unit and a number of mobile terminals which can communicate with the game unit, which game unit is adapted to send a game code to one or more mobile terminals and which mobile terminals are adapted to send at least one game code-related reply message to the game unit, wherein each reply message comprises an identification code of the mobile terminal, wherein the game code is a number comprising two or more digits, wherein each of said digits identifies a key of a mobile terminal and corresponds to three or four different letters from the alphabet, and each reply message is a word or a part of a word composed of one or more letters which have each been selected by means of the key identified by the respective digit of the game code, wherein the game unit is adapted to verify the letters of the reply message on their correspondence to the digits of the game code, wherein the game unit is arranged for verifying for each reply message whether the letters of the word correspond to the digits of the game code and the word formed by said letters, wherein the game unit is adapted to determine a score on the basis of the digits corresponding to the letters of the word, wherein the game unit is adapted to determine the score as the sum of the digits corresponding to the letters of the word from the reply message.

2. The system according to claim 1, wherein the game unit is adapted to send a next game message to the mobile terminal from which the reply message was received, which message depends on the received reply message.

3. The system according to claim 1, wherein the game unit is adapted to only accept the score if the sum of the digits is larger than the sum of the digits of the transmitted game code.

4. The system according to claim 3, wherein the game unit is adapted to record the sum of each accepted score for each mobile terminal and accumulate the sum of each accepted score for each mobile terminal to obtain a total score.

5. The system according to claim 4, wherein the game unit is adapted to compare each next word that is received from a mobile terminal with words previously received from said mobile terminal, with only the score of new words being accepted.

6. The system according to claim 1, wherein the game unit is adapted to determine the time of receipt of the reply messages, wherein the game unit selects one or more winning scores from the scores that were received in a first period of the game.

7. The system according to claim 6, wherein the game unit is adapted to select one or more winning scores from the scores that were received in a second period of the game, wherein the game unit is adapted to erase all the recorded scores after the second period.

8. A method for playing a game, wherein a game code is sent to one or more mobile terminals by means of a game unit, and wherein the mobile terminals send at least one game code-related reply message to the game unit, wherein each reply message comprises an identification code of the mobile terminal, wherein the game code is a number comprising two or more digits, wherein each of said digits identifies a key of a mobile terminal and corresponds to three or four different letters from the alphabet, and each reply message is a word or a part of a word composed of one or more letters which have each been selected by means of the key identified by the respective digit of the game code, wherein the game unit verifies the letters of the reply message on their correspondence to the digits of the game code, wherein the game unit verifies for each reply message whether the letters of the word correspond to the digits of the game code and the word formed by said letters, wherein the game unit determines a score on the basis of the digits corresponding to the letters of the word, wherein the game unit determines the score as the sum of the digits corresponding to the letters of the word from the reply message.

9. The method according to claim 8, wherein the game unit sends a next game message to the mobile terminal from which the reply message was received, which message depends on the received reply message.

10. The method according to claim 8, wherein the game unit only accepts the score if the sum of the digits is larger than the sum of the digits of the transmitted game code.

11. The method according to claim 10, wherein the game unit records the sum of each accepted score for each mobile terminal and accumulates the sum of each accepted score for each mobile terminal to obtain a total score.

12. The method according to claim 11, wherein the game unit compares each next word that is received from a mobile terminal with words previously received from said mobile terminal, with only the score of new words being accepted.

13. The method according to claim 8, wherein the game unit determines the time of receipt of the reply messages, wherein the game unit selects one or more winning scores from the scores that were received in a first period of the game.

14. The method according to claim 13, wherein the game unit selects one or more winning scores from the scores that were received in a second period of the game, wherein the game unit erases all the recorded scores after the second period.

* * * * *

UNITED STATES PATENT AND TRADEMARK OFFICE
CERTIFICATE OF CORRECTION

| | | |
|---|---|---|
| PATENT NO. | : 7,601,065 B2 | Page 1 of 1 |
| APPLICATION NO. | : 10/493666 | |
| DATED | : October 13, 2009 | |
| INVENTOR(S) | : Paul George Priester | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this

Fifth Day of October, 2010

David J. Kappos
*Director of the United States Patent and Trademark Office*